(12) United States Patent
Jun

(10) Patent No.: US 7,795,821 B2
(45) Date of Patent: Sep. 14, 2010

(54) BACK LIGHT UNIT HAVING A PLURALITY OF LUMINOUS ELEMENTS AND CONTROL METHOD THEREOF

(75) Inventor: Sung-gon Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 11/633,540

(22) Filed: Dec. 5, 2006

(65) Prior Publication Data
US 2007/0176885 A1    Aug. 2, 2007

(30) Foreign Application Priority Data
Feb. 2, 2006    (KR) .................... 10-2006-0010134

(51) Int. Cl.
*H05B 37/02*    (2006.01)
(52) U.S. Cl. .................. 315/308; 315/291; 315/149; 315/312; 345/102
(58) Field of Classification Search .............. 315/149, 315/158, 291, 307–309, 224, 209 R, 312; 345/102, 82, 87, 88, 107
See application file for complete search history.

(56) References Cited

U.S. PATENT DOCUMENTS

| 7,183,725 B2* | 2/2007 | Kim | 315/291 |
|---|---|---|---|
| 7,183,727 B2* | 2/2007 | Ferguson et al. | 315/308 |
| 7,262,752 B2* | 8/2007 | Weindorf | 345/82 |
| 7,511,434 B2* | 3/2009 | Shin | 315/291 |
| 7,595,785 B2* | 9/2009 | Jang | 345/102 |
| 2003/0231161 A1* | 12/2003 | Yamaguchi | 345/102 |
| 2005/0162737 A1 | 7/2005 | Whitehead et al. | |
| 2006/0022616 A1 | 2/2006 | Furukawa et al. | |
| 2009/0153464 A1 | 6/2009 | Furukawa et al. | |

FOREIGN PATENT DOCUMENTS

| CN | 1721943 | 1/2006 |
|---|---|---|
| EP | 1 619 656 | 1/2006 |

(Continued)

OTHER PUBLICATIONS

European Search Report dated Mar. 13, 2008 issued in EP 06077283.7.

(Continued)

*Primary Examiner*—Haissa Philogene
(74) *Attorney, Agent, or Firm*—Stanzione & Kim, LLP

(57) ABSTRACT

A back light unit (BLU) having a plurality of luminous elements, and a control method thereof is provided. The BLU includes a temperature detector to detect a temperature of the BLU, brightness detectors to detect a brightness of the plurality of luminous elements, a voltage supplier to supply a driving voltage to the plurality of luminous elements, respectively, and a controller to perform a first adjustment to adjust the driving voltage supplied to the plurality of luminous elements according to the temperature detected at the temperature detector, and to perform a second adjustment to adjust the driving voltage supplied to the plurality of luminous elements according to the brightness detected at the brightness detectors. Accordingly, the temperature of the BLU can be maintained stable, and the brightness can be controlled uniformly.

50 Claims, 8 Drawing Sheets

FOREIGN PATENT DOCUMENTS

| | | |
|---|---|---|
| EP | 1 628 286 | 2/2006 |
| JP | 2004-193029 | 7/2004 |
| KR | 2005-51501 | 6/2005 |
| KR | 2005-64913 | 6/2005 |
| KR | 2005-101526 | 10/2005 |
| WO | WO 03/107319 | 12/2003 |

OTHER PUBLICATIONS

Chinese Office Action issued Jan. 8, 2010 in CN Application No. 200610172146X.

* cited by examiner

BACK LIGHT UNIT HAVING A PLURALITY OF LUMINOUS ELEMENTS AND CONTROL METHOD THEREOF

CROSS-REFERENCE TO RELATED APPLICATIONS

This application claims priority under 35 U.S.C. §119(a) from Korean Patent Application No. 2006-10134, filed Feb. 2, 2006 in the Korean Intellectual Property Office, the entire contents of which are incorporated herein by reference.

BACKGROUND OF THE INVENTION

1. Field of the Invention

The present general inventive concept relates to a back light unit having a plurality of luminous elements, and a control method thereof. More particularly, the present general inventive concept relates to a back light unit (BLU) which adjusts a uniformity of brightness by controlling a temperature and a brightness of a plurality of luminous elements, and a control method thereof.

2. Description of the Related Art

Because a liquid crystal display (LCD) does not have its own luminous element, it is accompanied with a separate device to uniformly brighten an entire screen of the LCD. The LCD generally employs a back light unit (BLU) having a plurality of luminous elements to uniformly brighten the entire screen of the LCD.

The BLU generally includes a plurality of lamps as luminous elements. The luminous elements are arranged at the rear surface of the LCD. The use of a plurality of luminous elements causes disadvantage of an unstable brightness which varies according to an individual error of the luminous elements, a distance from a driving power source, and the like.

Therefore, it is necessary to ensure a uniformity of brightness of the BLU to achieve an excellent and regular brightness of the LCD.

If a driving voltage value of the luminous elements is adjusted in order to achieve a regular brightness, an extremely high voltage may be supplied to the luminous elements, increasing an internal temperature of the BLU, and the components of the BLU may be damaged or go out of order due to the supply of the extremely high voltage.

SUMMARY OF THE INVENTION

The present general inventive concept provides a back light unit (BLU) capable of maintaining a regular brightness, by adjusting an overall, or an individual supply of a driving voltage to luminous elements according to a current temperature and brightness, and a control method thereof.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a back light unit (BLU) having a plurality of luminous elements, the BLU including a temperature detector to detect a temperature of the BLU, a plurality of brightness detectors to detect a brightness of the plurality of luminous elements, a voltage supplier to supply driving voltages to the plurality of luminous elements, respectively, and a controller to perform a first adjustment to adjust the driving voltages supplied to the plurality of luminous elements according to the temperature detected at the temperature detector, and to perform a second adjustment to adjust the driving voltages supplied to the plurality of luminous elements according to the brightness detected at the brightness detectors.

When the first and the second adjustments are completed, the controller may check whether the temperature detected at the temperature detector is within a predetermined temperature range, and if determining that the temperature is outside the predetermined temperature range, the controller may perform the first and the second adjustments again.

The BLU may further include a computing part to compute a brightness uniformity using a lowest and a highest brightness detected at the brightness detectors.

When the brightness uniformity computed by the computing part does not satisfy a predetermined standard, the controller may perform a third adjustment to adjust the driving voltages supplied to at least one luminous element corresponding to the brightness detector detecting the lowest brightness and to at least one luminous element corresponding to the brightness detector detecting the highest brightness.

When the third adjustment is completed, the controller may check whether the temperature detected at the temperature detector is within a predetermined temperature range, and whether the brightness detected at the brightness detectors is within an acceptable brightness range, and may perform the first and the second adjustments again if the temperature is not within the predetermined temperature range or the brightness is not within the acceptable brightness range, respectively.

When the third adjustment is completed, the controller may also check whether the temperature detected at the temperature detector is within a predetermined temperature range, and whether an average brightness detected at the brightness detectors is within a predetermined brightness level, and may perform the first and the second adjustments again if the temperature is not within the predetermined temperature range or the average brightness is not within a predetermined brightness level, respectively.

The controller may perform the first adjustment by controlling the voltage supplier such that the voltage supplier incrementally increases the driving voltage supplied to at least one luminous element corresponding to the brightness detector detecting a lowest brightness detected when the temperature detected at the temperature detector is below a lowest threshold temperature of the predetermined temperature range, and the voltage supplier decrementally decreases the driving voltage supplied to at least one luminous element corresponding to the brightness detector detecting a highest brightness detected when the temperature detected at the temperature detector is above a highest threshold temperature of the predetermined temperature range.

The controller may perform the second adjustment by controlling the voltage supplier such that the voltage supplier incrementally increases the overall driving voltage supplied to the plurality of luminous elements when an average brightness of the plurality of luminous elements detected at the brightness detectors is lower than a predetermined brightness level, and the voltage supplier decrementally decreases the overall driving voltage supplied to the plurality of luminous elements when the average brightness detected at the brightness detectors is greater than the predetermined brightness level.

The controller may perform the first adjustment by controlling the voltage supplier such that the voltage supplier incrementally increases the overall driving voltage supplied to the plurality of luminous elements when the temperature detected at the temperature detector is less than the lowest threshold temperature of the predetermined temperature range, and the voltage supplier decrementally decreases the overall driving voltage supplied to the plurality of luminous elements when the temperature detected at the temperature detector exceeds the highest threshold temperature of the predetermined temperature range.

The control may perform the second adjustment by controlling the voltage supplier such that, when the brightness detected at the brightness detectors exceeds an acceptable brightness range, the voltage supplier decrementally decreases the driving voltage value supplied to at least one luminous element corresponding to a brightness detector detecting the brightness exceeding the acceptable brightness range, and when a brightness less than the acceptable brightness range is detected at the brightness detectors, the voltage supplier incrementally increases the driving voltage value supplied to at least one luminous element corresponding to a brightness detectors detecting the brightness less than the acceptable brightness range.

The temperature detector may be disposed at an upper middle part of the BLU.

The BLU may include a plurality of temperature detectors distributed about the BLU.

Each brightness detector may be disposed to correspond with a respective luminous element to detect the brightness of each corresponding luminous element.

Each brightness detector may be disposed to detect the brightness of two or more corresponding luminous elements.

The foregoing and/or other aspects and utilities of the present general inventive concept are also achieved by providing a back light unit (BLU) having a plurality of luminous elements, the BLU including a plurality of brightness detectors, each to respectively detect the brightness of a corresponding luminous element group, a temperature detector to detect the temperature of the BLU, a voltage supplier to supply the plurality of luminous elements with respective driving voltages, and a controller to control the driving voltages supplied to the plurality of luminous elements.

The corresponding luminous element group may include only one luminous element of the plurality of luminous elements.

The corresponding luminous element group may include two or more luminous elements of the plurality of luminous elements.

The controller may perform a first adjustment to adjust the driving voltages supplied to the plurality of luminous elements depending on a temperature of the BLU detected by the temperature detector.

The controller may perform a second adjustment to adjust the driving voltages supplied to the plurality of luminous elements depending on a brightness of the plurality of luminous elements detected by the brightness detectors.

The controller may perform the first adjustment to control the voltage supplier to increase the driving voltage supplied to the luminous element group corresponding to a brightness detector detecting a lowest brightness, when the temperature detected by the temperature detector is lower than a reference temperature range, and the controller may perform the first adjustment to control the voltage supplier to decrease the driving voltage supplied to the luminous element group corresponding to a brightness detector detecting a highest brightness when the temperature detected is higher than a reference temperature range.

The controller may perform the first adjustment to control the voltage supplier to increase the overall driving voltage supplied to the plurality of luminous elements when the temperature detected by the temperature detector is lower than a reference temperature range, and the controller may perform the first adjustment to control the voltage supplier to decrease the overall driving voltage supplied to the plurality of luminous elements when the temperature detected by the temperature detector is higher than a reference temperature range, The controller may perform the second adjustment to control the voltage supplier to decrease the overall driving voltage supplied to the plurality of luminous elements when an average brightness detected by the brightness detectors is above a reference brightness range, and the controller may perform the second adjustment to control the voltage supplier to increase the overall driving voltage supplied to the plurality of luminous elements when the average brightness detected is below the reference brightness or brightness range.

The controller may perform the second adjustment to control the voltage supplier to decrease the driving voltage supplied to the luminous element group corresponding to a brightness detector detecting a brightness above an acceptable brightness range, when a brightness above the acceptable brightness range is detected by the brightness detectors, and the controller may perform the second adjustment to control the voltage supplier to increase the driving voltage supplied to the luminous element group corresponding to a brightness detector detecting a brightness below the acceptable brightness range when a brightness below the acceptable brightness range is detected.

The BLU may also include a computing part to compute a brightness uniformity of the BLU and the controller may perform a third adjustment to adjust the driving voltage supplied to the plurality of luminous elements depending on the brightness uniformity computed by the computing part.

The controller may perform the third adjustment to increase the driving voltage supplied to the luminous element group corresponding to a brightness detector detecting a lowest brightness and to decrease the driving voltage supplied to the luminous element group corresponding to a brightness detector detecting a highest brightness when the brightness uniformity computed by the computing part does not satisfy a reference standard.

The temperature detector may include a plurality of temperature detectors distributed about the BLU.

The foregoing and/or other aspects and utilities of the present general inventive concept are also achieved by providing a method of controlling a back light unit (BLU) having a plurality of luminous elements, the method including detecting a temperature of the BLU, detecting a brightness of the plurality of luminous elements, performing a first adjustment to adjust the driving voltages supplied to the plurality of luminous elements according to the detected temperature, and performing a second adjustment to adjust the driving voltages supplied to the plurality of luminous elements according to the detected brightness.

The detecting of the brightness of the plurality of luminous elements may include each of the plurality of brightness detectors detecting a brightness of one of the plurality of luminous elements.

The detecting of the brightness of the plurality of luminous elements may include each of the plurality of brightness detectors detecting the brightness of two or more luminous elements of the plurality of luminous elements.

The method may also include checking whether the temperature is within a predetermined temperature range after the first and second adjustments are performed, and if the temperature is outside the predetermined temperature range, repeating the first and the second adjustments.

The method may also include computing a brightness uniformity using a lowest brightness detected and a highest brightness detected.

The method may also include performing a third adjustment when the computed brightness does not satisfy a predetermined standard to adjust the driving voltage supplied to at least one luminous element with the lowest detected brightness and at least one luminous element with the highest detected brightness.

The method may also include, checking, after the third adjustment is completed, whether the temperature detected is within a predetermined range, and whether an average of all the brightness detected is within a predetermined range, and performing the first, the second and the third adjustments again if the temperature detected is not within the predetermined range, the average brightness is not within the predetermined brightness range, and/or the computed brightness does not satisfy the predetermined standard, respectively.

The method may also include checking, after the third adjustment is completed, whether the temperature detected is within a predetermined range, and whether the brightness detected is within an acceptable brightness range, and performing the first, the second and the third adjustments again if the temperature detected is not within the predetermined range, the brightness detected is not within the acceptable brightness range, and/or the computed brightness does not satisfy the predetermined standard, respectively.

The performing of the first adjustment may include incrementally increasing the driving voltage supplied to at least one luminous element corresponding to the lowest brightness detected when the detected temperature is lower than the lowest threshold temperature of a predetermined temperature range, and decrementally decreasing the driving voltage supplied to at least one luminous element corresponding to the highest brightness detected when the detected temperature exceeds a highest threshold temperature of the predetermined temperature range.

The performing of the second adjustment may include incrementally increasing an overall driving voltage supplied to the plurality of luminous elements when an average brightness of the plurality of luminous elements detected is lower than a predetermined brightness level, and decrementally decreasing the overall driving voltage supplied to the plurality of luminous elements when the average brightness exceeds the predetermined brightness level.

The performing of the first adjustment may include incrementally increasing the overall driving voltage supplied to the plurality of luminous elements when the detected temperature is lower than a lowest threshold temperature of a predetermined temperature range, and decrementally decreasing the overall driving voltage supplied to the plurality of luminous elements when the detected temperature exceeds a highest threshold temperature of the predetermined temperature range.

The performing of the second adjustment may include decrementally decreasing the driving voltage supplied to at least one luminous element corresponding to a brightness exceeding an acceptable brightness range when the detected brightness of the plurality of luminous elements exceeds an acceptable brightness range, and incrementally increasing the driving voltage supplied to at least one luminous element corresponding to a brightness lower than the acceptable brightness range when the detected brightness of the plurality of luminous elements is lower than the acceptable brightness range.

The detecting of the temperature of the BLU may be performed by a temperature detector disposed at an upper middle part of the BLU.

The detecting of the temperature of the BLU may be performed by a plurality of temperature detectors distributed around the BLU.

The foregoing and/or other aspects and utilities of the present general inventive concept are also achieved by providing a method of controlling a back light unit (BLU) having a plurality of luminous elements, the method including detecting a temperature of the BLU, detecting a brightness of the plurality of luminous elements, performing a first adjustment to adjust driving voltages supplied to the plurality of luminous elements according to the detected temperature, and performing a second adjustment to adjust driving voltages supplied to the plurality of luminous elements according to the detected brightness.

The method may also include computing a brightness uniformity of the BLU, and performing a third adjustment to adjust driving voltages supplied to the plurality of luminous elements according to the computed brightness uniformity.

The performing of the first adjustment may include increasing an overall driving voltage supplied to the plurality of luminous elements when the temperature detected is below a reference temperature range, and decreasing the overall driving voltage supplied to the plurality of luminous elements when the temperature detected is above a reference temperature range.

The performing of the first adjustment may include increasing the driving voltages supplied to one or more luminous elements corresponding to a lowest brightness detected when the temperature detected is below a reference temperature range, and decreasing the driving voltages supplied to one or more luminous elements corresponding to a highest brightness detected when the temperature detected is above a reference temperature range.

The performing of the second adjustment may include decreasing an overall driving voltage supplied to the plurality of luminous elements when an average of all the brightness detected is above a reference brightness range, and increasing the overall driving voltage supplied to the plurality of luminous elements when the average of all the brightness detected is below the reference brightness range.

The performing of the second adjustment may include decreasing the driving voltages supplied to one or more luminous elements corresponding to a brightness detected above an acceptable brightness range, when the detected brightness of the plurality of luminous elements is above an acceptable brightness range, and increasing the driving voltages supplied to one or more luminous elements corresponding to a brightness detected below the acceptable brightness range when the detected brightness of the plurality of luminous elements is below the acceptable driving range.

The performing of the third adjustment may include increasing the driving voltages supplied to one or more luminous elements corresponding to a lowest brightness detected and decreasing the driving voltages of one or more luminous elements corresponding to a highest brightness detected when the computed brightness uniformity does not satisfy a reference brightness uniformity or brightness uniformity range.

The method may also include determining an abnormal operation state of the plurality of luminous elements.

The determining of the abnormal operation may include determining that an abnormal operating state exists when the brightness detected does not change after the first or second adjustment is performed to adjust the driving voltages of the plurality of luminous elements.

The first and second adjustments may adjust the driving voltages of one or more luminous elements, and the determining of the abnormal operation may include determining that an abnormal operating state exists when the brightness detected of the one or more luminous elements does not change after the first or second adjustment is performed to adjust the driving voltages of the one or more luminous elements.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
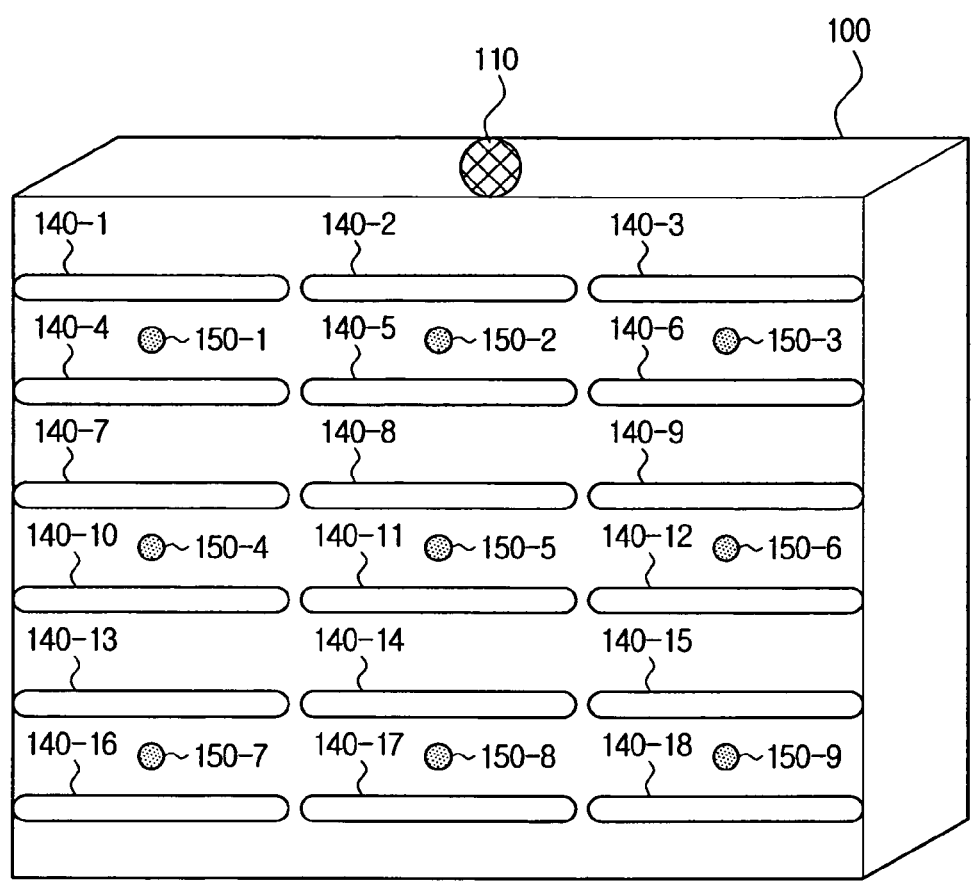
FIG. 1 is a view illustrating a structure of a back light unit (BLU) according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a structure of a back light unit (BLU) according to an embodiment of the present general inventive concept. Referring to FIG. 1, a back light unit (BLU) 100 includes a temperature detector 110, a plurality of luminous elements 140, and a plurality of brightness detectors 150

Figure 7:
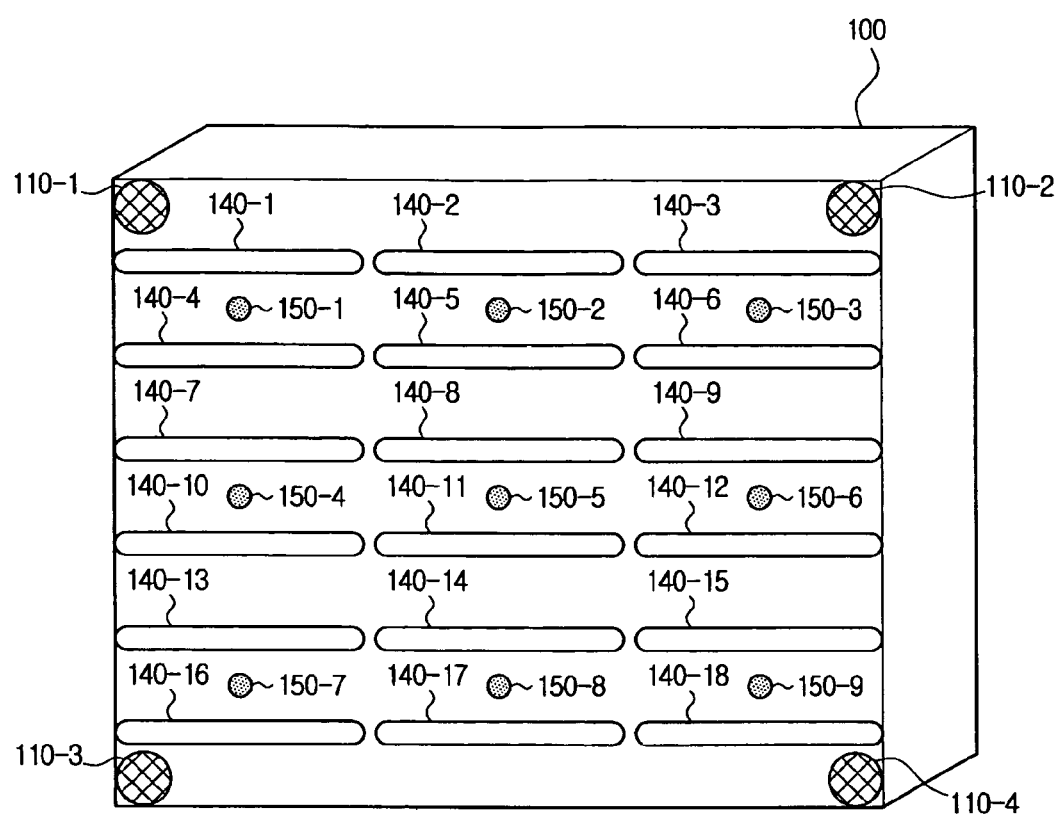
FIG. 7 is a view illustrating a structure of a back light unit (BLU) according to another exemplary embodiment of the present general inventive concept.
Figure 8:
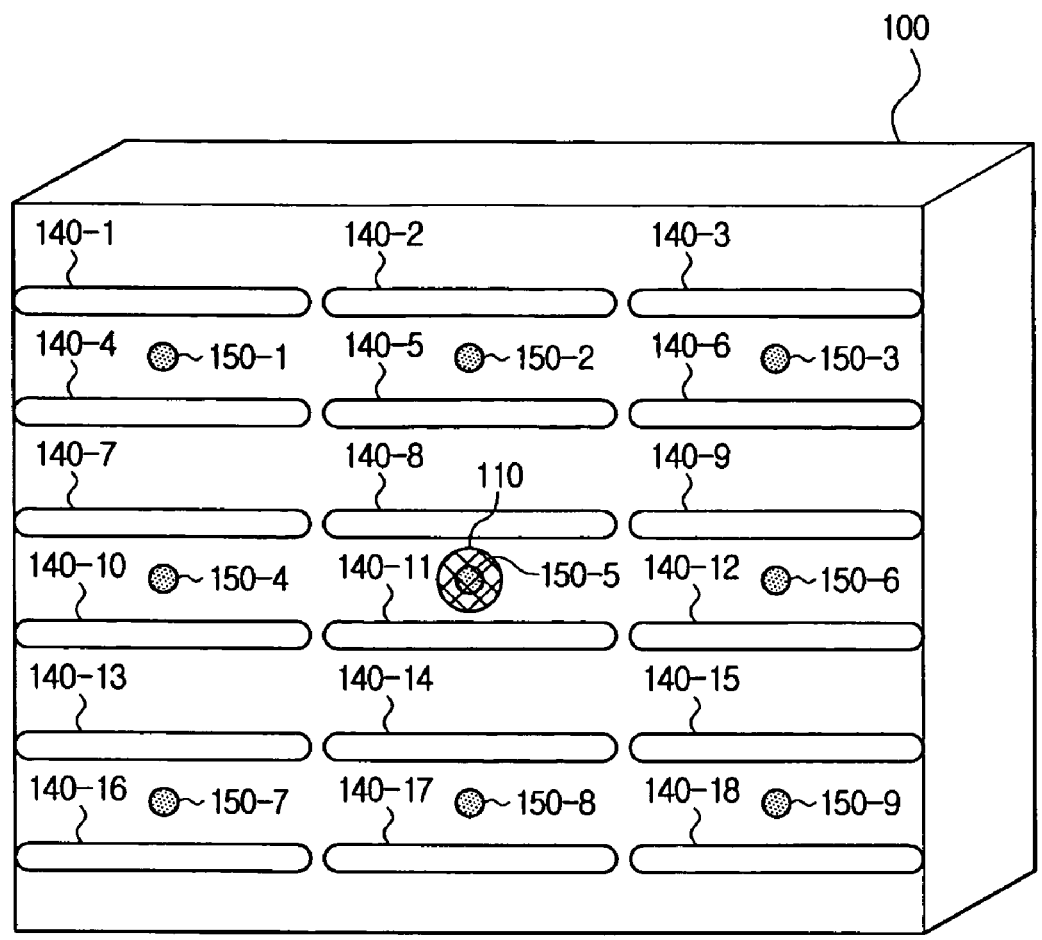
FIG. 8 is a view illustrating a structure of a back light unit (BLU) according to another exemplary embodiment of the present general inventive concept.

The temperature detector 110 detects a temperature of the BLU 100. According to the embodiment of FIG. 1, the temperature detector 110 may be disposed at an upper middle part of the BLU 100. The temperature may be higher at the upper part than at a lower part of the BLU 100 due to a convection phenomenon, and problems due to temperature more frequently occur with a higher inner temperature. Therefore, when one temperature detector 110 is employed, the detector 110 may be placed at the upper middle part of the BLU 100. However, when a plurality of temperature detectors 110 are disposed, as in another exemplary embodiment of the present general inventive concept, the temperature detectors 110 may be placed at each corner of the BLU 100, around a middle part of the BLU 100, or in other arrangements to accurately detect the temperature of the BLU 100. FIG. 7 illustrates another exemplary embodiment of the present general inventive concept with temperature detectors 110-1 through 110-4 arranged at each corner of a BLU. FIG. 8 illustrates yet another exemplary embodiment of the present general inventive concept with a temperature detector 110 disposed surrounding a temperature detector 150-5.

The plurality of luminous elements 140 (i.e. luminous elements 140-1 through 140-18) may be arranged along a front side of the BLU 100. Intervals between the luminous elements 140 and positions of the luminous elements 140 may vary according to a number of the luminous elements 140, a size of the luminous elements 140, a size of the BLU 100, illumination characteristics of the luminous elements, or the like.

The brightness detectors 150 (i.e. brightness detectors 150-1 through 150-9) may be arranged between the luminous elements 140. Accordingly, the brightness detectors 150 detect a brightness of the corresponding luminous elements 140 nearby. According to FIG. 1, each brightness 150 detector may be arranged between two luminous elements 140. For example, a first brightness detector 150-1 may be disposed between a first luminous element 140-1 and a fourth luminous elements 140-4, and a second brightness detector 150-2 may be disposed between a second luminous element 140-2 and a fifth luminous elements 140-5. Similarly, the rest of the brightness detectors 150 may each be disposed between two luminous elements 140. While FIG. 1 illustrates each brightness detector 150 as disposed between two luminous elements 140, an arrangement of brightness detectors 150 according to the present general inventive concept is not limited thereto. The brightness detectors 150 may be arranged such that one brightness detector 150 corresponds to one luminous element 140 or one brightness detector 150 corresponds to two or more luminous elements 140.

A driving voltage may be separately supplied to the plurality of luminous elements 140, and accordingly, the brightness may differ according to a level of driving voltages supplied to the luminous elements 140.

According to the temperature of the BLU 100 detected by the temperature detector 110, the BLU 100 individually controls the driving voltages supplied to the luminous elements 140. For example, when a low temperature is detected, the brightness of the luminous elements 140 are respectively checked through the brightness detectors 150, and the driving voltages supplied to the luminous elements 140 may be incrementally increased. When a high temperature is detected, the driving voltages supplied to the luminous elements 140 may be decrementally decreased. This process of adjusting the driving voltages supplied to the luminous elements 140 according to the detected temperature will be referred to as a "first adjustment" hereinbelow.

When the temperature detected is within a predetermined stable temperature range or is adjusted within a predetermined stable temperature range using the first adjustment, the BLU 100 compares the brightness detected from the brightness detectors 150 with a predetermined brightness, and adjusts the driving voltages supplied to the luminous elements 140 accordingly. This process of adjusting the driving voltages supplied to the luminous elements 140 according to the brightness detected will be referred to as a "second adjustment."

Figure 2:
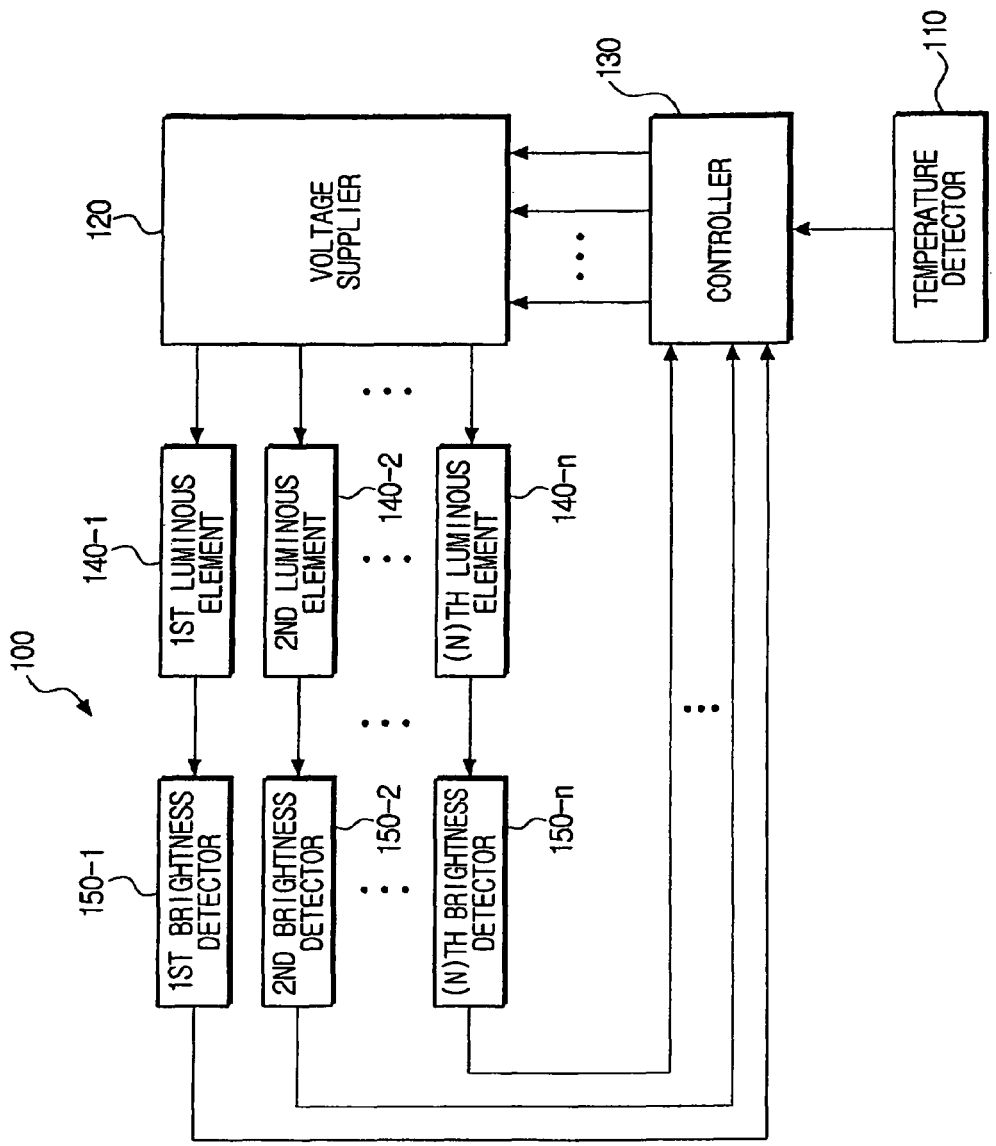
FIG. 2 is a block diagram illustrating a back light unit (BLU) according to an exemplary embodiment of the present general inventive concept.

FIG. 2 is a block diagram illustrating a structure of the BLU 100 of FIG. 1. According to FIG. 2, the BLU 100 includes a temperature detector 110, a voltage supplier 120, a controller 130, a plurality of luminous elements 140 (140-1 to 140-$n$), and a plurality of brightness detectors 150 (150-1 to 150-$n$).

The temperature detector 110 detects a temperature of the BLU 100. The temperature detector 110 may be placed at the upper middle part of the BLU 100 as illustrated in the embodiment of FIG. 1.

The voltage supplier 120 is connected with the luminous elements 140-1~140-$n$ and supplies driving voltages thereto.

Therefore, the plurality of luminous elements 140-1~140-$n$ are lit by the driving voltages supplied through the voltage supplier 120. The luminous elements may include LEDs (Light Emitting Diode), CCFLs (Cold Cathode Fluorescent Lamps), EEFL (External Electrode Fluorescent Lamps), and the like.

Each of the brightness detectors 150-1~150-$n$ are disposed to correspond to at least one of the luminous elements 140-1~140$n$, and thus detect the brightness of the corresponding luminous element(s) 140. The brightness detected through the brightness detectors 150-1~150$n$ is transmitted to the controller 130. In FIG. 2 each of the brightness detectors 150-1 to 150-$n$ detects a brightness of one corresponding luminous element 140-1 to 140-$n$.

The controller 130 performs a first adjustment and a second adjustment, using the temperature of the BLU 100 detected by the temperature detector 110 and the brightness detected by the brightness detectors 150-1~150-$n$. The first and the second adjustments according to an exemplary embodiment of the present general inventive concept will now be explained in greater detail below.

The controller 130 checks if the detected temperature of the BLU 100 is below a first threshold temperature. The first threshold temperature may be set to a minimum required temperature for a normal operation of the BLU 100. Accordingly, when a temperature lower than the first threshold temperature is detected, the controller 130 controls the voltage supplier 120 to increase the driving voltage which is supplied to the corresponding luminous element 140 of a brightness detector 150 that detects the minimum brightness.

The controller 130 then checks if the detected temperature exceeds a second threshold temperature. The second threshold temperature may be set to a maximum temperature that would not affect the normal operation of the BLU 100. Accordingly, when the detected temperature exceeds the second threshold temperature, the controller 130 controls the voltage supplier 120 to decrementally decrease the driving voltage which is supplied to the corresponding luminous element 140 of a brightness detector 150 that detects the maximum brightness. Accordingly, the controller 130 may be able to control the temperature of the BLU 100 by controlling the driving voltages supplied to corresponding ones of the luminous elements 140. In the following explanation, the temperature below the first threshold temperature is called a "first temperature section," the temperature exceeding the second threshold temperature is called a "third temperature section," and a temperature exceeding the first threshold temperature and below the second threshold temperature is called a "second temperature section." For example, a temperature from about 0° C. to about 40° C. may be within the second temperature section, a temperature of about 0° C. or under may be within the first temperature section, and a temperature of about 40° C. or above may be within the third temperature section. The first and the second threshold temperatures, the degree of temperature increase and decrease, and/or a degree of driving voltage increase and decrease may be set by a user, or pre-set at the manufacturing site.

The controller 130 performs the first adjustment and if the detected temperature of the BLU 100 detected by the temperature detector 110 falls within the second temperature section, the controller 130 performs the second adjustment as described below.

The controller 130 checks the level of the brightness detected from the brightness detectors 150-1~150-$n$, and detects an average brightness using the detected brightness. More specifically, the average brightness can be obtained by dividing the sum of all the detected brightness by the total number of the brightness detectors 150-1~150-$n$. Accordingly, when the average of the detected brightness is less than a predetermined brightness, the controller 130 may control the voltage supplier 120 to incrementally increase an overall driving voltage supplied to the plurality of luminous elements 140-1~140-$n$.

When the average of the detected brightness is greater than the predetermined brightness, the controller 130 may control the voltage supplier 120 to decrementally decrease the overall driving voltage supplied to the luminous elements 140-1~140-$n$. The predetermined brightness may be set by a user, or set at the factory during the manufacturing process. Accordingly, the overall brightness of the BLU 100 can be adjusted.

First and second adjustments according to another exemplary embodiment of the present general inventive concept are explained below.

The controller 130 checks if the temperature of the BLU 100 detected by the temperature detector 110 falls within the second temperature section. If the temperature falls within the first temperature section, the controller 130 controls the voltage supplier 120 to incrementally increase an overall driving voltage supplied to the luminous elements 140-1~140-$n$.

If the temperature falls within the third temperature section, the controller 130 controls the voltage supplier 120 to decrementally decrease the overall driving voltage supplied to the luminous elements 140-1~140-$n$. Accordingly, the controller 130 can adjust the overall temperature of the BLU 100 using the first adjustment.

If the temperature detected falls within the second temperature section, or the temperature is adjusted by the first adjustment to within the second temperature section, the controller 130 then performs the second adjustment according to another exemplary embodiment of the present general inventive concept described below.

When a brightness exceeding an acceptable brightness range is detected from the brightness detectors 150-1~150-$n$, the controller 130 controls the voltage supplier 120 to decrementally decrease the driving voltage which is supplied to the luminous element 140 corresponding to a brightness detector 150 detecting a brightness above an acceptable brightness range. The "acceptable brightness range" can be defined as an acceptable difference between a user-set or manufacturing pre-set brightness and the detected brightness, or the user or manufacturing site may set an appropriate range between a lowest and a highest acceptable brightness.

When a brightness below the acceptable brightness range is detected from the brightness detectors 150-1~150-$n$, the controller 130 controls the voltage supplier 120 to incrementally increase the driving voltage which is supplied to the luminous element 140 corresponding to the brightness detector 150 detecting a brightness below the acceptable brightness range. Accordingly, the controller 130 can adjust the brightness of the BLU 100 by individually controlling the driving voltages supplied to each of the individual luminous elements 140.

First and second adjustment according to yet another exemplary embodiment of the present general inventive concept are explained below.

The controller 130 checks if the detected temperature of the BLU 100 falls within the second temperature section. If the temperature detected falls within the first temperature section, the controller 130 controls the voltage supplier 120 to incrementally increase the driving voltage which is supplied to the corresponding luminous element 140 of a brightness detector 150 detecting a lowest brightness.

If the temperature detected falls within the third temperature section, the controller 130 controls the voltage supplier 120 to decrementally decrease the driving voltage which is supplied to the corresponding luminous element 140 of a brightness detector 150 detecting a highest brightness.

If the temperature detected falls within the second temperature section, the controller 130 performs the second adjustment according to yet another exemplary embodiment of the present general inventive concept as described below.

When a brightness exceeding an acceptable brightness range is detected from the brightness detectors 150-1~150-$n$, the controller 130 controls the voltage supplier 120 to decrementally decrease the driving voltage which is supplied to the corresponding luminous element 140 of a brightness detector detecting a brightness above the acceptable brightness range. The "acceptable brightness range" may be an acceptable difference between a user-set brightness or a factory pre-set brightness and the detected brightness, or the user or manufacturing site may set an appropriate range between a lowest and a highest brightness.

When a brightness below the acceptable brightness range is detected from the brightness detectors 150-1~150-$n$, the controller 130 controls the voltage supplier 120 to incrementally increase the driving voltage which is supplied to the corresponding luminous element 140 of a brightness detector 150 detecting a brightness below the acceptable brightness range.

The first and the second adjustments according to various embodiments of the present general inventive concept have been explained above.

When the first and the second adjustments are completed, the controller 130 re-checks the temperature of the BLU 100 detected from the temperature detector 110, and checks if the detected temperature falls within the second temperature section. If the detected temperature is outside the second temperature section, the controller 130 re-performs the first and the second adjustments.

Figure 3:
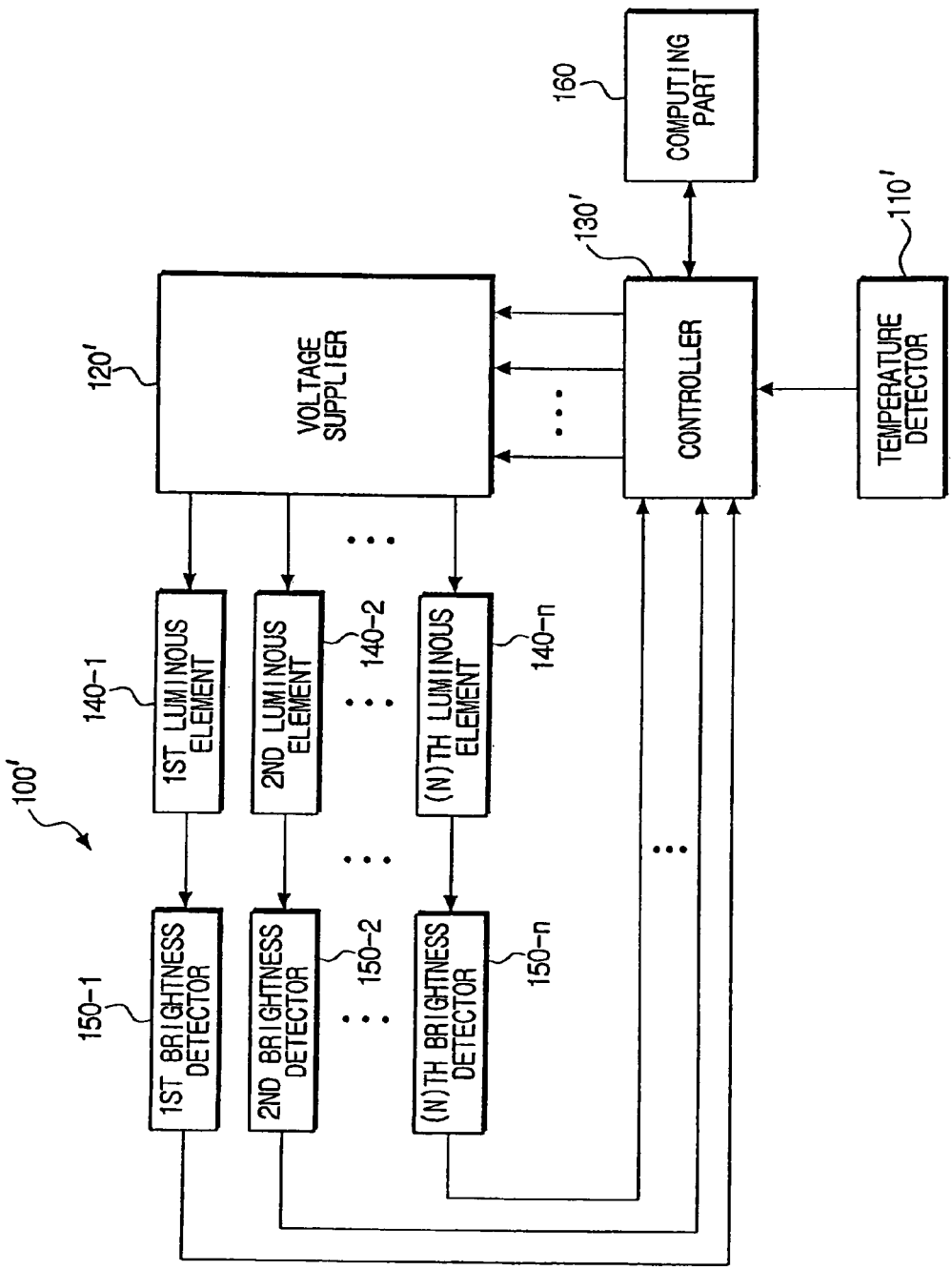
FIG. 3 is a block diagram illustrating a back light unit (BLU) according to another exemplary embodiment of the present general inventive concept.

FIG. 3 is a block diagram illustrating the structure of the BLU 100 of FIG. 1 according to another exemplary embodiment of the present general inventive concept.

According to FIG. 3, the BLU 100' includes a temperature detector 110', a voltage supplier 120', a controller 130', a plurality of luminous elements 140 (140-1~140-$n$), a plurality of brightness detectors 150 (150-1~150-$n$), and a computing part 160. In the following description with respect to FIG. 3, the elements similar to those of FIG. 2 will not be explained for the sake of brevity.

The computing part 160 computes a brightness uniformity using a lowest and a highest brightness detected from the brightness detectors 150-1-150-$n$, and provides the results to the controller 130'.

The brightness uniformity can be computed by the following mathematical expression:

Brightness uniformity(%)=100×(highest brightness−lowest brightness)/highest brightness    Mathematical expression 1

Similar to the controller 130 of FIG. 2, the controller 130' of FIG. 3 performs a first adjustment, using the temperature detected by the temperature detector 110', and a second adjustment, using the brightness detected by the brightness detectors 150, to control the driving voltages supplied to the plurality of luminous elements 140. The controller 130' performs the first and second adjustments in a similar way to that according to the various embodiments of first and second adjustments explained above with respect to the embodiment presented in FIG. 2.

When the brightness uniformity obtained by the computing part 160 does not satisfy a reference brightness uniformity, the controller 130' performs a third adjustment by incrementally increasing the lowest brightness, and decrementally decreasing the highest brightness. The reference brightness uniformity may be 20% or less. The reference brightness uniformity may be set during the manufacture, may be set by a user, and may be set differently depending on uses of the product.

The controller 130' incrementally increases the driving voltage which is supplied to the corresponding luminous element 140 of a brightness detector 150 detecting the lowest brightness, and decrementally decreases the driving voltage which is supplied to the corresponding luminous element 140 of a brightness detector 150 detecting the highest brightness in the third adjustment. The controller 130' may check the temperature and the brightness again when the third adjustment is completed, and may perform the first and the second adjustments again according to the result.

When detecting through the plurality of brightness detectors 150-1~150-$n$ that the brightness does not vary with the incrementally, or decrementally adjusted driving voltage supplied by the voltage supplier 120', the controller 130' may determine that at least one luminous element 140 corresponding to a brightness detector 150, used to choose which luminous element was to have its driving voltage increased or decreased, is in abnormal operation and thus may indicate this to a user through a separate display. Accordingly, self-check may be possible regarding the plurality of luminous elements 140. The controller 130' can display the result of self-check through the display, or notify the user.

Figure 4:
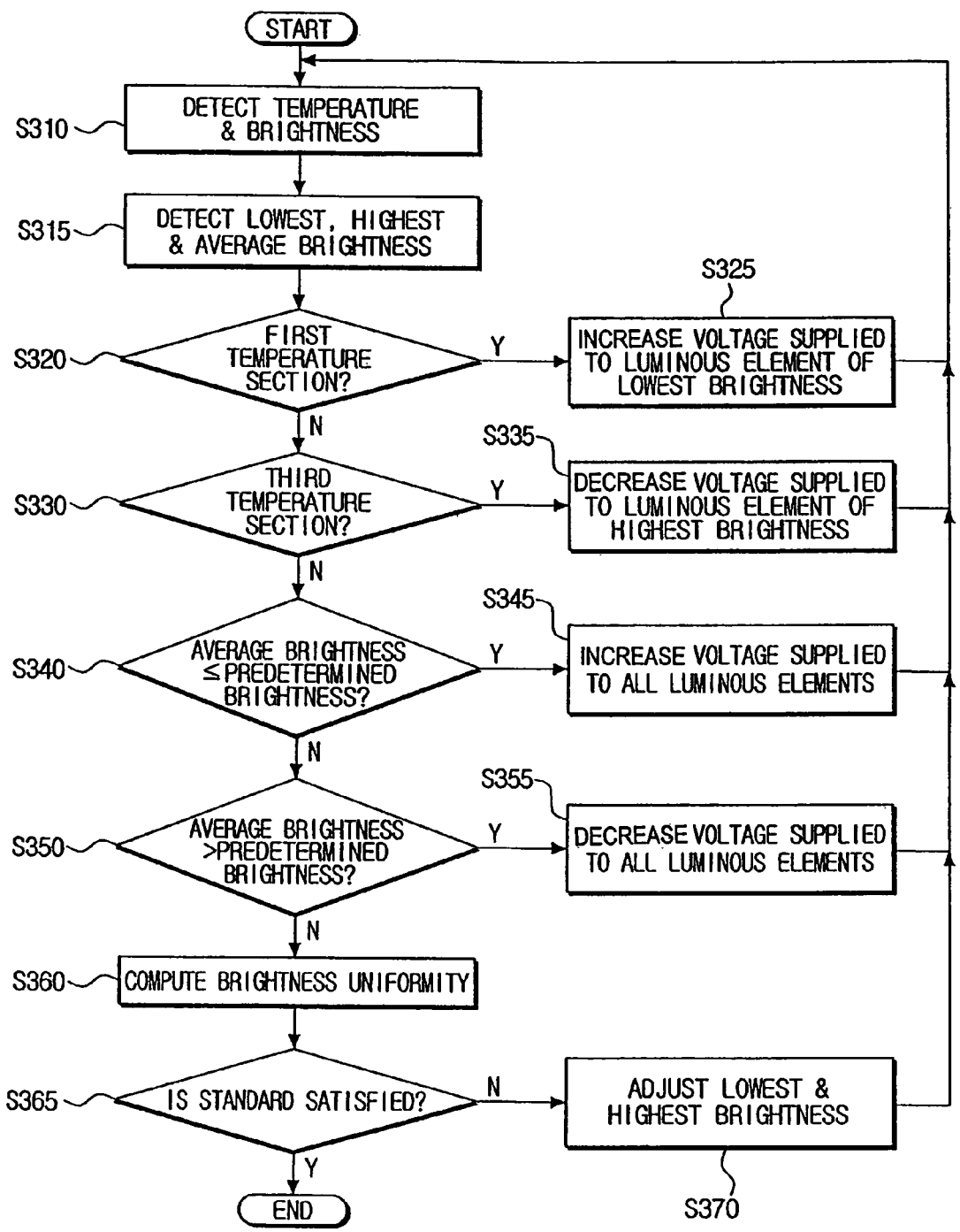
FIG. 4 is a flowchart illustrating a method to control a temperature and a brightness of a back light unit (BLU) according to yet another exemplary embodiment of the present general inventive concept.

FIG. 4 is a flowchart illustrating a method of controlling a temperature and a brightness of a BLU according to an embodiment of the present general inventive concept.

According to FIG. 4, the temperature and the brightness of the BLU is first detected in operation S310. The temperature can be detected using a temperature detector, such as a temperature sensor provided at an upper middle part of the BLU. The brightness can be detected by a brightness detector such as a brightness sensor which corresponds to at least one luminous element Next, in operation S315, the BLU detects a highest brightness, a lowest brightness, and an average brightness of the brightness detected by the brightness detectors.

In operation S320, the BLU then compares the detected temperature with a first threshold temperature and determines whether the current temperature falls within a first temperature section. If the current temperature is within the first temperature section, the BLU incrementally increases the driving voltage which is supplied to the luminous element of the lowest brightness in operation S325. More specifically, the BLU incrementally increases the driving voltage which is supplied to at least one luminous element corresponding to a brightness detector detecting the lowest brightness.

If the detected current temperature is not within the first temperature section, the BLU compares the detected temperature with a second threshold temperature and determines whether the current temperature falls within a third temperature section in operation S330. If the current temperature is within the third temperature section, the BLU decrementally decreases the driving voltage which is supplied to the luminous element of the highest brightness in operation S335. More specifically, the BLU decrementally decreases the driving voltage which is supplied to at least one luminous element corresponding to a brightness detector detecting the highest brightness.

If the detected temperature is within a second temperature section, the BLU compares the average brightness obtained in operation S315 with a predetermined brightness, and if the average brightness is less than the predetermined brightness in operation S340, the BLU incrementally increases an overall driving voltage which is supplied to the plurality of luminous elements in operation S345. Because the overall brightness of the plurality of luminous elements can be increased, the average brightness increases accordingly.

In operation S350 the BLU determines whether the average brightness is greater than the predetermined brightness. If the average brightness is greater than the predetermined brightness, the BLU decrementally decreases the overall driving voltage which is supplied to the plurality of luminous elements in operation S355. Because the overall brightness of the plurality of luminous elements can be decreased, the average brightness decreases accordingly.

After that, when the average brightness matches the predetermined brightness, or the average brightness is within a predetermined brightness range, the BLU computes a brightness uniformity in operation S360. The brightness uniformity can be obtained by the mathematical expression 1 introduced above.

In operation S365, the BLU checks if the computed brightness uniformity satisfies a predetermined standard. If the computed brightness uniformity satisfies the predetermined standard, the BLU keeps the currently adjusted driving voltage as it is. If the brightness uniformity does not satisfy the standard, the BLU incrementally increases the driving voltage which is supplied to at least one luminous element corresponding to the brightness detector detecting the lowest brightness, and decrementally decreases the driving voltage which is supplied to at least one luminous element corresponding to the brightness detector detecting the highest brightness in operation S370. The BLU then re-checks the temperature, and the brightness according to the adjusted driving voltage, and determines whether the temperature and the brightness are in the acceptable range. As a result, both the temperature and the brightness can be adjusted to the stable range, while the brightness uniformity is also improved.

Figure 5:
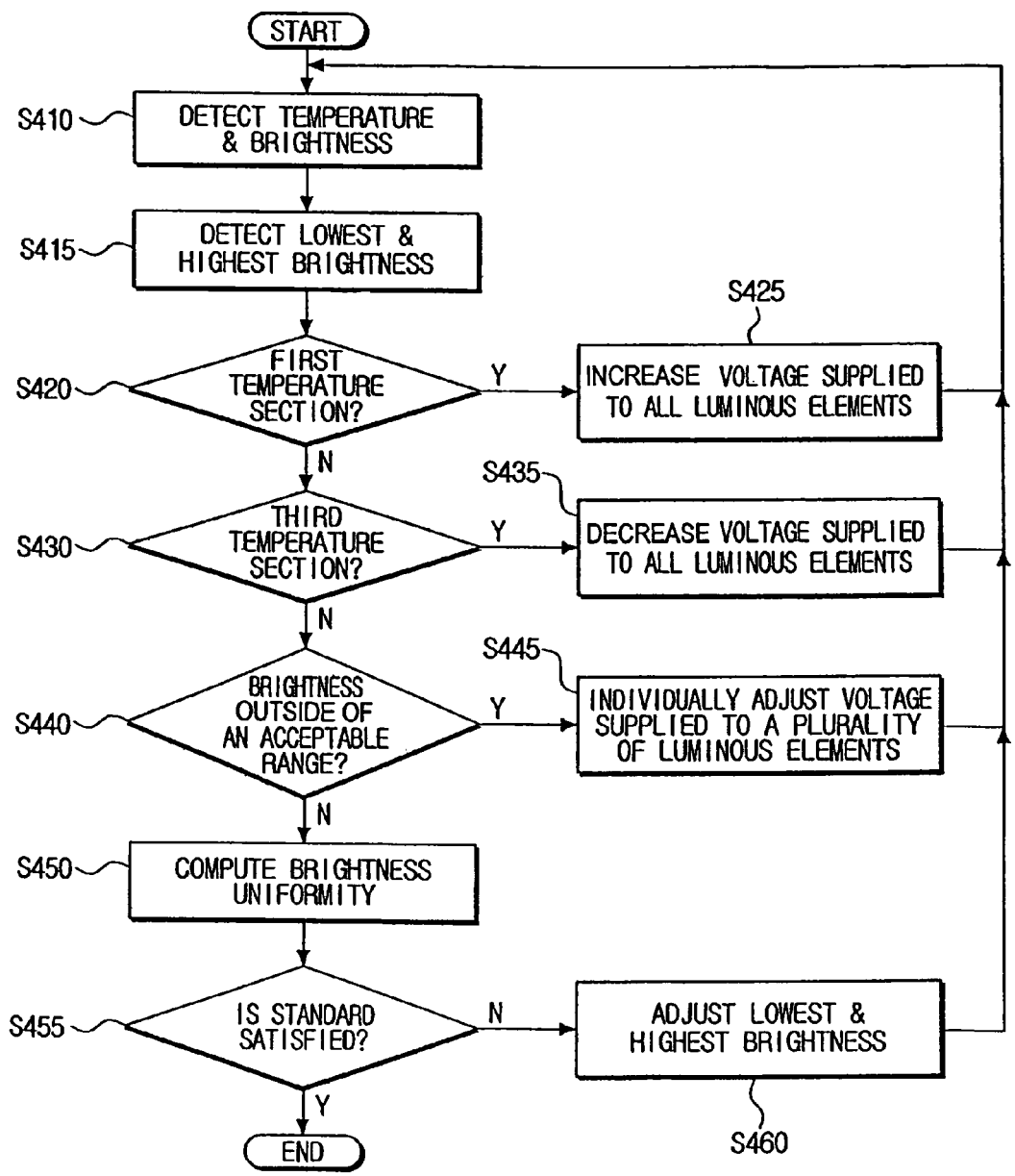
FIG. 5 is a flowchart illustrating a method to control a temperature and a brightness of a back light unit (BLU) according to yet another embodiment of the present general inventive concept.

FIG. 5 is a flowchart illustrating a temperature and brightness control method of the BLU according to another exemplary embodiment of the present general inventive concept.

According to FIG. 5, first a temperature and a brightness of the BLU are detected in operation S410.

After that, the BLU detects a highest and a lowest brightness from the detected brightness in operation S415.

Next, in operation S420, the BLU compares the detected temperature with a first threshold temperature, and determines whether the current temperature falls within a first temperature section. If the current temperature is within the first temperature section, the BLU incrementally increases the overall driving voltage to a plurality of luminous elements in operation S425.

If the detected temperature is not within the first temperature section, the BLU compares the detected temperature with a second threshold temperature and determines whether the current temperature falls within a third temperature section in operation S430. If the current temperature is within the third temperature section, the BLU 100 decrementally decreases the overall driving voltage to the luminous elements in operation S435.

When the detected temperature is within a second temperature section, the BLU checks whether the brightness detected through the brightness detectors is outside an acceptable brightness range in operation S440. If determining so, the BLU individually adjusts the driving voltage which is supplied to the respective luminous elements in operation S445. Specifically, if a brightness of the plurality of luminous elements greater than an acceptable brightness range is detected the BLU decrementally decreases the driving voltage which is supplied to at least one luminous element corresponding to a brightness detector detecting a brightness higher than the acceptable brightness range, and if a brightness of the plurality of luminous elements less than an acceptable brightness range is detected, the BLU incrementally increases the driving voltage which is supplied to at least one luminous element corresponding to a brightness detector detecting a brightness lower than the acceptable brightness range. After adjusting the brightness as explained above, the BLU checks the temperature and the brightness again and may re-adjust the temperature and the brightness according to the result.

When a brightness deviating from the acceptable range is not detected, a brightness uniformity is computed in operation S450. In this case, when the computed brightness uniformity satisfies a predetermined standard in operation S455, the driving voltage is maintained as currently adjusted. However, if the brightness uniformity does not satisfy the predetermined standard in operation S455, the driving voltage supplied to the luminous element corresponding to a brightness detector detecting the lowest brightness is incrementally increased, and the driving voltage supplied to the luminous element corresponding to a brightness detector detecting the highest brightness is decrementally decreased in operation S460. Accordingly, the brightness uniformity of the BLU is adjusted. When the adjustment of the brightness uniformity is completed, the temperature and the brightness are checked again and they may be re-adjusted according to the result.

Figure 6:
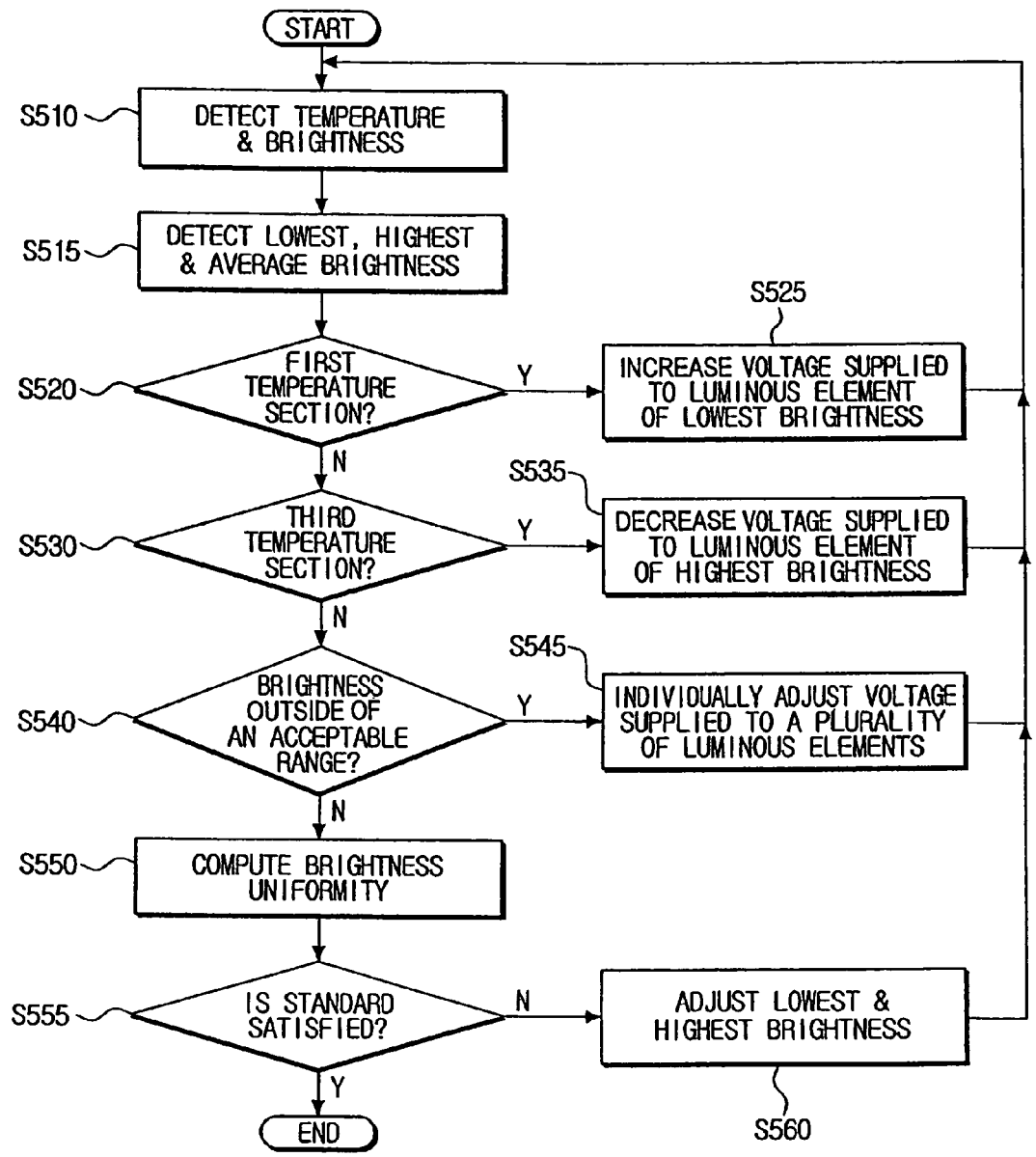
FIG. 6 is a flowchart illustrating a method to control a temperature and a brightness of a back light unit (BLU) according to yet another embodiment of the present general inventive concept.

FIG. 6 is a flowchart illustrating a method of controlling a temperature and a brightness of a BLU according yet another exemplary embodiment of the present general inventive concept. According to FIG. 6, the temperature and the brightness of the BLU are detected in operation S510.

In operation S515, the BLU 100 detects a highest, a lowest and an average brightness among the detected brightness.

In operation S520, the BLU compares the detected temperature with a first threshold temperature and determines whether the current temperature falls within a first temperature section. If the current temperature is within the first temperature section, the BLU incrementally increases the driving voltage which is supplied to the luminous element of the lowest brightness in operation S525. More specifically, the BLU incrementally increases the driving voltage which is supplied to at least one luminous element corresponding to a brightness detector detecting the lowest brightness.

If the detected current temperature is not within the first temperature section, the BLU compares the detected temperature with a second threshold temperature and determines whether the current temperature falls within a third temperature section in operation S530. If the current temperature is within the third temperature section, the BLU decrementally decreases the driving voltage which is supplied to the luminous element of the highest brightness in operation S535. More specifically, the BLU decrementally decreases the driving voltage which is supplied to at least one luminous element corresponding to a brightness detector detecting the highest brightness.

When the detected temperature is within a second temperature section, the BLU checks whether the brightness detected through the brightness detector is outside of an acceptable range in operation S540. If determining so, the BLU individually adjusts the driving voltages which are supplied to the respective luminous elements in operation S545. Specifically, if a brightness of the plurality of luminous elements above an acceptable brightness range is detected, the BLU decrementally decreases the driving voltage which is supplied to at least one luminous element corresponding to a brightness detector detecting a brightness greater than the acceptable range, and if a brightness of the plurality of luminous elements below an acceptable brightness range is detected, the BLU incrementally increases the driving voltage which is supplied to at least one luminous element corresponding to a brightness detector detecting a brightness less than the acceptable range. After adjusting the brightness as explained above, the BLU checks the temperature and the brightness again.

Then when a brightness deviating from the acceptable range is not detected, a brightness uniformity is computed in operation S550. In this case, when the computed brightness uniformity satisfies a predetermined standard in operation S555, the driving voltage is maintained as currently adjusted. However, if the brightness uniformity does not satisfy the predetermined standard in operation S555, the driving voltage supplied to the luminous element corresponding to the brightness detector detecting the lowest brightness is incrementally increased, and the driving voltage supplied to the luminous element corresponding to the brightness detector detecting the greatest brightness is decrementally decreased in operation S560. Accordingly, the brightness uniformity of the BLU 100 is adjusted. When the adjustment of the brightness uniformity is completed, the temperature and the brightness are checked again and they may be re-adjusted according to the result.

As explained above, according to various exemplary embodiments of the present general inventive concept, a temperature of a BLU can be detected and controlled, and at the same time, a brightness of a plurality of luminous elements can also be detected and controlled. Moreover, temperature detectors and brightness detectors can be arrange differently to better detect a brightness and/or temperature of the BLU. As a result, the temperature and a brightness of a BLU can be stable, and a brightness uniformity of a BLU can be increased. Additionally, by detecting changes in brightness according to a driving voltage adjustment, self-check on the plurality of luminous elements can be enabled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A back light unit (BLU) having a plurality of luminous elements, the BLU comprising:
   a temperature detector to detect a temperature of the BLU;
   a plurality of brightness detectors to detect a brightness of the plurality of luminous elements;
   a voltage supplier to supply driving voltages to the plurality of luminous elements, respectively; and
   a controller to perform a first adjustment to adjust the driving voltages supplied to the plurality of luminous elements according to the temperature detected at the temperature detector, and to subsequently perform a second adjustment to adjust the driving voltages supplied to the plurality of luminous elements according to the brightness detected at the brightness detectors.

2. The BLU of claim 1, wherein, when the first and the second adjustments are completed, the controller checks whether the temperature detected at the temperature detector is within a predetermined temperature range, and if determining that the temperature is outside the predetermined temperature range, the controller performs the first and the second adjustments again.

3. The BLU of claim 1, further comprising:
   a computing part to compute a brightness uniformity using a lowest and a highest brightness detected at the brightness detectors.

4. The BLU of claim 3, wherein, when the brightness uniformity computed by the computing part does not satisfy a predetermined standard, the controller performs a third adjustment to adjust the driving voltages supplied to at least one luminous element corresponding to a brightness detector detecting the lowest brightness and to at least one luminous element corresponding to a brightness detector detecting the highest brightness.

5. The BLU of claim 4, wherein, when the third adjustment is completed, the controller checks whether the temperature detected at the temperature detector is within a predetermined temperature range, and whether the brightness detected at the brightness detectors is within an acceptable brightness range, and performs the first and the second adjustments again if the temperature is not within the predetermined temperature range or the brightness is not within the acceptable brightness range, respectively.

6. The BLU of claim 4, wherein, when the third adjustment is completed, the controller checks whether the temperature detected at the temperature detector is within a predetermined temperature range, and whether an average brightness detected at the brightness detectors is within a predetermined brightness level, and performs the first and the second adjustments again if the temperature is not within the predetermined temperature range or the average brightness is not within a predetermined brightness level, respectively.

7. The BLU of claim 1, wherein the controller performs the first adjustment by controlling the voltage supplier such that the voltage supplier incrementally increases the driving voltage supplied to at least one luminous element corresponding to a brightness detector detecting a lowest brightness detected when the temperature detected at the temperature detector is below a lowest threshold temperature of the predetermined temperature range, and the voltage supplier decrementally decreases the driving voltage supplied to at least one luminous element corresponding to a brightness detector detecting a highest brightness detected when the temperature detected at the temperature detector exceeds the highest threshold temperature of the predetermined temperature range.

8. The BLU of claim 1, wherein the controller performs the second adjustment by controlling the voltage supplier such that the voltage supplier incrementally increases the overall driving voltage supplied to the plurality of luminous elements when an average brightness of the plurality of luminous elements detected at the brightness detectors is less than a predetermined brightness level, and the voltage supplier decrementally decreases the overall driving voltage supplied to the plurality of luminous elements when the average brightness detected at the brightness detectors is greater than the predetermined brightness level.

9. The BLU of claim 1, wherein the controller performs the first adjustment by controlling the voltage supplier such that the voltage supplier incrementally increases the overall driving voltage supplied to the plurality of luminous elements when the temperature detected at the temperature detector is less than the lowest threshold temperature of the predetermined temperature range, and the voltage supplier decrementally decreases the overall driving voltage supplied to the plurality of luminous elements when the temperature detected at the temperature detector exceeds the highest threshold temperature of the predetermined temperature range.

10. The BLU of claim 1, wherein the control performs the second adjustment by controlling the voltage supplier such that, when the brightness detected at the brightness detectors exceeds an acceptable brightness range, the voltage supplier decrementally decreases the driving voltage supplied to at least one luminous element corresponding to a brightness detector detecting the brightness exceeding the acceptable brightness range, and when a brightness less than the acceptable brightness range is detected at the brightness detectors, the voltage supplier incrementally increases the driving voltage supplied to at least one luminous element corresponding to a brightness detectors detecting the brightness less than the acceptable brightness range.

11. The BLU of claim 1, wherein the temperature detector is disposed at an upper middle part of the BLU.

12. The BLU of claim 1, wherein the temperature detector omprises a plurality of temperature detectors distributed about the BLU.

13. The BLU of claim 1, wherein each brightness detector is disposed to correspond with a respective luminous element to detect the brightness of each corresponding luminous element.

14. The BLU of claim 1, wherein each brightness detector is disposed to detect the brightness of two or more corresponding luminous elements.

15. A back light unit (BLU) having a plurality of luminous elements, the BLU comprising:
- a plurality of brightness detectors, each to respectively detect the brightness of a corresponding luminous element group;
- a temperature detector to detect the temperature of the BLU;
- a voltage supplier to supply the plurality of luminous elements with respective driving voltages; and
- a controller to check the level of the brightness detected from respective brightness detectors, detect an average brightness using the detected brightness, and control the driving voltages supplied to the plurality of luminous elements in response to a comparison between the level of the average brightness and a predetermined brightness.

16. The BLU of claim 15, wherein the corresponding luminous element group comprises only one luminous element of the plurality of luminous elements.

17. The BLU of claim 15, wherein the corresponding luminous element group comprises two or more luminous elements of the plurality of luminous elements.

18. The BLU of claim 15, wherein the controller performs a first adjustment to adjust the driving voltages supplied to the plurality of luminous elements depending on a temperature of the BLU detected by the temperature detector.

19. The BLU of claim 15, wherein the controller performs a second adjustment to adjust the driving voltages supplied to the plurality of luminous elements depending on a brightness of the plurality of luminous elements detected by the brightness detectors.

20. The BLU of claim 18, wherein the controller performs the first adjustment to control the voltage supplier to increase the driving voltage supplied to the luminous element group corresponding to a brightness detector detecting a lowest brightness, when the temperature detected by the temperature detector is lower than a reference temperature range, and wherein the controller performs the first adjustment to control the voltage supplier to decrease the driving voltage supplied to the luminous element group corresponding to a brightness detector detecting a highest brightness when the temperature detected by the temperature detected is higher than a reference temperature range.

21. The BLU of claim 18, wherein the controller performs the first adjustment to control the voltage supplier to increase the overall driving voltage supplied to the plurality of luminous elements when the temperature detected by the temperature detector is lower than a reference temperature range, and wherein the controller performs the first adjustment to control the voltage supplier to decrease the overall driving voltage supplied to the plurality of luminous elements when the temperature detected by the temperature detector is higher than a reference temperature range.

22. The BLU of claim 19, wherein the controller performs the second adjustment to control the voltage supplier to decrease the overall driving voltage supplied to the plurality of luminous elements when an average brightness detected by the brightness detectors is above a reference brightness range, and wherein the controller performs the second adjustment to control the voltage supplier to increase the overall driving voltage supplied to the plurality of luminous elements when the average brightness detected is below the reference brightness or brightness range.

23. The BLU of claim 19, wherein the controller performs the second adjustment to control the voltage supplier to decrease the driving voltage supplied to the luminous element group corresponding to a brightness detector detecting a brightness above an acceptable brightness range, when a brightness above the acceptable brightness range is detected by the brightness detectors, and wherein the controller performs the second adjustment to control the voltage supplier to increase the driving voltage supplied to the luminous element group corresponding to a brightness detector detecting a brightness below the acceptable brightness range when a brightness below the acceptable brightness range is detected.

24. The BLU of claim 15, further comprising:
- a computing part to compute a brightness uniformity of the BLU and the controller performs a third adjustment to adjust the driving voltage supplied to the plurality of luminous elements depending on the brightness uniformity computed by the computing part.

25. The BLU of claim 24, wherein the controller performs the third adjustment to increase the driving voltage supplied to the luminous element group corresponding to a brightness detector detecting a lowest brightness and to decrease the driving voltage supplied to the luminous element group corresponding to a brightness detector detecting a highest brightness when the brightness uniformity computed by the computing part does not satisfy a reference standard.

26. The BLU of claim 15, wherein the temperature detector comprises a plurality of temperature detectors distributed about the BLU.

27. The BLU of claim 15, wherein the average brightness is obtained by dividing the sum of all the detected brightness by the total number of brightness detectors.

28. A method of controlling a back light unit (BLU) having a plurality of luminous elements, the method comprising:
   detecting a temperature of the BLU;
   detecting a brightness of the plurality of luminous elements;
   performing a first adjustment to adjust the driving voltages supplied to the plurality of luminous elements according to the detected temperature; and
   subsequently performing a second adjustment to adjust driving voltages supplied to the plurality of luminous elements according to the detected brightness.

29. The method of claim 28, wherein the detecting of the brightness of the plurality of luminous elements comprises each of the plurality of brightness detectors detecting a brightness of one of the plurality of luminous elements.

30. The method of claim 28, further comprising:
   checking whether the temperature is within a predetermined temperature range after the first and second adjustments are performed, and if the temperature is outside the predetermined temperature range, repeating the first and the second adjustments.

31. The method of claim 28, further comprising:
   computing a brightness uniformity using a lowest brightness detected and a highest brightness detected.

32. The method of claim 31, further comprising:
   performing a third adjustment when the computed brightness does not satisfy a predetermined standard to adjust the driving voltage supplied to at least one luminous element with the lowest detected brightness and at least one luminous element with the highest detected brightness.

33. The method of claim 32, further comprising:
   checking, after the third adjustment is completed, whether the temperature detected is within a predetermined range, and whether an average of all the brightness detected is within a predetermined brightness range, and performing the first, the second and the third adjustments again if the temperature detected is not within the predetermined range, the average brightness is not within the predetermined brightness range, and/or the computed brightness does not satisfy the predetermined standard, respectively.

34. The method of claim 32, further comprising:
   checking, after the third adjustment is completed, whether the temperature detected is within a predetermined range, and whether the brightness detected is within an acceptable brightness range, and performing the first, the second and the third adjustments again if the temperature detected is not within the predetermined range, the brightness detected is not within the acceptable brightness range, and/or the computed brightness does not satisfy the predetermined standard, respectively.

35. The method of claim 28, wherein the performing of the first adjustment comprises incrementally increasing the driving voltage supplied to at least one luminous element corresponding to a lowest brightness detected when the detected temperature is lower than the lowest threshold temperature of a predetermined temperature range, and decrementally decreasing the driving voltage supplied to at least one luminous element corresponding to a highest brightness detected when the detected temperature exceeds a highest threshold temperature of the predetermined temperature range.

36. The method of claim 28, wherein the performing of the second adjustment comprises incrementally increasing an overall driving voltage supplied to the plurality of luminous elements when an average brightness of the plurality of luminous elements detected is lower than a predetermined brightness level, and decrementally decreasing the overall driving voltage supplied to the plurality of luminous elements when the average brightness exceeds the predetermined brightness level.

37. The method of claim 28, wherein the performing of the first adjustment comprises incrementally increasing the overall driving voltage supplied to the plurality of luminous elements when the detected temperature is lower than a lowest threshold temperature of a predetermined temperature range, and decrementally decreasing the overall driving voltage supplied to the plurality of luminous elements when the detected temperature exceeds a highest threshold temperature of the predetermined temperature range.

38. The method of claim 28, wherein the performing of the second adjustment comprises decrementally decreasing the driving voltage supplied to at least one luminous element corresponding to a brightness exceeding an acceptable brightness range when the detected brightness of the plurality of luminous elements exceeds an acceptable brightness range, and incrementally increasing the driving voltage supplied to at least one luminous element corresponding to a brightness lower than the acceptable brightness range when the detected brightness of the plurality of luminous elements is lower than the acceptable brightness range.

39. The method of claim 28, wherein the detecting of the temperature of the BLU is performed by a temperature detector disposed at an upper middle part of the BLU.

40. The method of claim 28, wherein the detecting of the temperature of the BLU is performed by a plurality of temperature detectors distributed around the BLU.

41. The method of claim 29, wherein the detecting of the brightness of the plurality of luminous elements comprises each of the plurality of brightness detectors detecting the brightness of two or more luminous elements of the plurality of luminous elements.

42. A method of controlling a back light unit (BLU) having a plurality of luminous elements, the method comprising:
   detecting a temperature of the BLU;
   detecting a brightness of the plurality of luminous elements;
   performing a first adjustment to adjust driving voltages supplied to the plurality of luminous elements according to the detected temperature;
   performing a second adjustment to adjust the driving voltages supplied to the plurality of luminous elements according to the detected brightness; and
   determining an abnormal operation state, of the plurality of luminous elements.

43. The method of claim 42, wherein the performing of the first adjustment comprises increasing an overall driving voltage supplied to the plurality of luminous elements when the temperature detected is below a reference temperature range, and decreasing the overall driving voltage supplied to the plurality of luminous elements when the temperature detected is above a reference temperature range.

44. The method of claim 42, wherein the performing of the first adjustment comprises increasing the driving voltages supplied to one or more luminous elements corresponding to a lowest brightness detected when the temperature detected is below a reference temperature range, and decreasing the driving voltages supplied to one or more luminous elements corresponding to a highest brightness detected when the temperature detected is above a reference temperature range.

45. The method of claim 42, wherein the performing of the second adjustment comprises decreasing an overall driving voltage supplied to the plurality of luminous elements when an average of all the brightness detected is above a reference brightness range, and increasing the overall driving voltage supplied to the plurality of luminous elements when the average of all the brightness detected is below the reference brightness range.

46. The method of claim 42, wherein the performing of the second adjustment comprises decreasing the driving voltages supplied to one or more luminous elements corresponding to a brightness detected above an acceptable brightness range, when the detected brightness of the plurality of luminous elements is above an acceptable brightness range, and increasing the driving voltages supplied to one or more luminous elements corresponding to a brightness detected below the acceptable brightness range when the detected brightness of the plurality of luminous elements is below the acceptable driving range.

47. The method of claim 42, further comprising:
computing a brightness uniformity of the BLU; and
performing a third adjustment to adjust the driving voltages supplied to the plurality of luminous elements according to the computed brightness uniformity.

48. The method of claim 42, wherein the performing of the third adjustment comprises increasing the driving voltages supplied to one or more luminous elements corresponding to a lowest brightness detected and decreasing the driving voltages of one or more luminous elements corresponding to a highest brightness detected when the computed brightness uniformity does not satisfy a reference brightness uniformity or brightness uniformity range.

49. The method of claim 42, wherein the determining of the abnormal operation comprises determining that an abnormal operating state exists when the brightness detected does not change after the first or second adjustment is performed to adjust the driving voltages of the plurality of luminous elements.

50. The method of claim 42, wherein the first and second adjustments adjust the driving voltages of one or more luminous elements, and the determining of the abnormal operation comprises determining that an abnormal operating state exists when the brightness detected of the one or more luminous elements does not change after the first or second adjustment is performed to adjust the driving voltages of the one or more luminous elements.

* * * * *